US 8,845,292 B2

(12) United States Patent
Lafont

(10) Patent No.: US 8,845,292 B2
(45) Date of Patent: Sep. 30, 2014

(54) BLADE-RETAINING DEVICE FOR TURBOMACHINE PROPELLER

(75) Inventor: Laurent Lafont, Pechbusque (FR)

(73) Assignee: Airbus Operations S.A.S., Toulouse (FR)

(*) Notice: Subject to any disclaimer, the term of this patent is extended or adjusted under 35 U.S.C. 154(b) by 455 days.

(21) Appl. No.: 13/386,173

(22) PCT Filed: Jul. 20, 2010

(86) PCT No.: PCT/FR2010/051523
§ 371 (c)(1),
(2), (4) Date: Jan. 20, 2012

(87) PCT Pub. No.: WO2011/010059
PCT Pub. Date: Jan. 27, 2011

(65) Prior Publication Data
US 2012/0121417 A1 May 17, 2012

(30) Foreign Application Priority Data
Jul. 22, 2009 (FR) ..................... 09 55088

(51) Int. Cl.
B64C 11/10 (2006.01)
B64C 11/48 (2006.01)
F02K 3/02 (2006.01)
F02C 6/20 (2006.01)
F01D 21/04 (2006.01)
F04D 29/34 (2006.01)
F04D 29/32 (2006.01)
F01D 5/30 (2006.01)
B64C 11/04 (2006.01)
B64D 27/02 (2006.01)

(52) U.S. Cl.
CPC .............. F01D 21/045 (2013.01); B64C 11/48 (2013.01); Y02T 50/673 (2013.01); F05D 2220/324 (2013.01); F02K 3/025 (2013.01); F02C 6/206 (2013.01); Y02T 50/66 (2013.01); B64D 2027/026 (2013.01); F04D 29/34 (2013.01); F04D 29/322 (2013.01); F01D 5/3053 (2013.01); B64C 11/04 (2013.01)
USPC ....................................... 416/204 R; 416/246

(58) Field of Classification Search
CPC ........ B64C 11/04; B64C 11/06; B64C 11/10; B64C 11/065; B64C 11/08; B64C 11/16; B64C 11/20
USPC .......... 416/204 R, 204 A, 244 R, 246, 244 A, 416/248, 207
See application file for complete search history.

(56) References Cited

U.S. PATENT DOCUMENTS 2,660,252 A * 11/1953 Doussain et al. ......... 416/134 R
(Continued)

OTHER PUBLICATIONS

International Search Report and Written Opinion issued May 12, 2011 in PCT/FR2010/051523 filed Jul. 20, 2010 (with English translation).

(Continued)

Primary Examiner — Richard Edgar
(74) Attorney, Agent, or Firm — Oblon, Spivak, McClelland, Maier & Neustadt, L.L.P.

(57) ABSTRACT

An aircraft turbomachine propeller including multiple blades assembled on a hub rotating around an axis of rotation of the propeller, that can reduce risks of loss of the blade following impact of a foreign body. At least one blade includes a recess opening radially towards the inside in the area of the base of this blade. A retaining device includes a moving retaining mechanism positioned in the recess and configured to be moved from a retracted position to a deployed blade-retaining position, and vice versa.

10 Claims, 5 Drawing Sheets

(56) References Cited

U.S. PATENT DOCUMENTS

| | | |
|---|---|---|
| 3,303,889 A | 2/1967 | Bates |
| 2010/0215499 A1 | 8/2010 | Lafont |
| 2012/0070287 A1 | 3/2012 | Lafont et al. |

OTHER PUBLICATIONS

French Preliminary Search Report issued Apr. 8, 2010 in patent application No. FR 0955088 with English Translation of Category of Cited Documents.

* cited by examiner

BLADE-RETAINING DEVICE FOR TURBOMACHINE PROPELLER

TECHNICAL FIELD

The present invention relates to an aircraft turbomachine propeller formed from an assembly of blades mounted on a revolving support. The invention concerns more specifically a device to retain the blade on the said support.

STATE OF THE PRIOR ART

Traditionally, a turbomachine with propellers of the "open rotor" type includes two contra-rotating propellers each having multiple blades.

The turbomachine habitually includes a free turbine with two contra-rotating rotors, where each rotor causes a rotating support, on which the blades of one of the propellers are assembled, to rotate around the propeller's axis of rotation.

In FIG. 1 an example of a portion of a propeller including a blade 1 assembled on a propeller hub 2 is illustrated as a lengthways section along the propeller's axis of rotation.

It should be noted that axis of rotation I-I of the propeller coincides in this case with the engine shaft. In the remainder of this document a right-handed Cartesian coordinate system is defined in terms of cylindrical coordinates ($e_L, e_R, e_T$) in which $e_L$ is the lengthways direction corresponding to axis of rotation I-I of the propeller and aligned in the aircraft's direction of forward motion due to the thrust of the turbomachine, $e_R$ is the radial direction of a point belonging to the turbomachine, and $e_T$ is the tangential or circumferential direction at this point.

In the remainder of the description, the terms "upper" and "lower" must be understood in terms of distance relative to the propeller's axis of rotation I-I.

In addition, the expressions "towards the outside" and "towards the inside" must be understood as a radial movement away from or a radial movement towards the propeller's axis of rotation I-I.

Lastly, the terms "forward" and "backward" make reference to the aircraft's direction of forward motion resulting from the thrust of the turbomachine, where this direction is represented by arrow $e_L$.

Blade 1 includes a vane 10 which extends a blade base 20 assembled on the said propeller hub 2.

Hub 2 is a roughly annular part. It includes multiple traversing apertures along radial direction $e_R$, where each aperture holds the base of the corresponding blade.

The said vane 10 is positioned so as to be in contact with the surrounding air of the turbomachine and extends in a direction roughly parallel to $e_R$. Vane 10 is demarcated by a shell 11 the general shape of which has an aerodynamic profile. Shell 11 encloses a hollow structural core 12 which extends in a direction roughly parallel to $e_R$.

Blade base 20 is assembled pivoting around a secondary axis parallel to radial direction $e_R$ on hub 2, where the pivoting movement is provided by a ball bearing system 3.

Propeller hub 2 is flanged between two coaxial casings, a central casing 60 and a lower casing 70, which together demarcate a flow path of hot air, which is also rotating relative to these casings. There is also an upper casing 80 which surrounds the said casings 60, 70 and hub 2. It demarcates the aerodynamic profile of the turbomachine.

A propeller according to this example of the prior art nevertheless has certain disadvantages.

The blade is generally held in the area of the hub by traditional holding means. However, in the event of the impact of a foreign body against the vane, such as a bird or a hailstone, or again in the event of the development of a fatigue crack or a corrosion point, the risk of uncoupling of a portion of the blade or of the entire blade is particularly high, something which traditional holding means cannot prevent.

The released portion may then strike the fuselage of the aircraft or the nearby vanes, and cause damage which will be greater the higher the mass of the debris. It should be noted that the base forms the heaviest portion of the blade.

The propeller according to the embodiment of the prior art described above does not enable the risks of loss of the blade in general, and of its base in particular, to be minimised.

DESCRIPTION OF THE INVENTION

The principal goal of the invention is to present an aircraft turbomachine propeller remedying at least partly the disadvantages mentioned above concerning the embodiment of the prior art described with reference to FIG. 1.

To accomplish this the object of the invention is an aircraft turbomachine propeller, including multiple blades, where each includes a base assembled on a hub rotating around an axis of rotation of the propeller.

According to the invention, at least one blade includes a recess opening radially towards the inside in the area of the base of this blade. In addition, the said propeller includes, in association with the said recess, a blade-retaining device which is stationary in terms of translational motion in a radial direction towards the outside relative to the said hub, including moving retaining means positioned in the said recess and able to occupy:

a retracted position in which the said moving retaining means do not form a stop for the said blade in the said radial direction towards the outside, and a deployed position in which the said moving retaining means form a stop for the said blade in the said radial direction towards the outside;

and to be moved from one to the other of the said positions.

According to the preferred embodiment of the invention, the said moving retaining means are able to be moved from the said retracted position to the said deployed position by the centrifugal force resulting from the rotation of the blade around the propeller's said axis of rotation.

In their deployed position configuration the moving retaining means have a greater transverse separation, relative to the radial direction, than in their retracted position configuration.

Thus, the meaning of "deployed position" is a position in which the moving retaining means have a greater transverse separation, relative to the radial direction, than in their retracted position configuration.

The meaning of "transverse separation" is a relative average movement away from one another of the moving means in a direction which is transverse relative to the radial direction. "Average movement" must be understood in terms of the distance between the centres of gravity of the moving retaining means.

Thus, when they occupy the deployed position the moving retaining means can have a larger visible surface than that which they have in their retracted position. The visible surface may be defined according to the radial direction relative to the hub.

Thus, the invention procures an additional device, enabling, under certain conditions, retention of the entire blade or of a portion of the latter in a radial position determined relative to the propeller's axis of rotation.

Indeed, under normal propeller operating conditions the blade is held on the hub in its radial position by traditional, or primary, means for holding the blade.

In the event of a breakage of a portion of the blade or of the entire blade, of the hub itself and/or of the primary holding means, and when the propeller is rotating, the retaining device prevents the blade assembly or a portion of it from uncoupling from the propeller and leaving the said radial operating position before striking the fuselage of the aircraft or the nearby blades.

The retaining device according to the invention has the feature that it is able to be active or inactive, depending on whether the moving retaining means are, respectively, in their deployed or their retracted positions.

When the retaining device according to the invention is active the moving retaining means form a stop for the said blade in the radial direction towards the outside. The said stop may or may not be operative.

Under normal operating conditions the stop formed by the moving retaining means is not effective, or operative, if the blade remains held by the primary means of holding the blade in its radial position on the hub.

The said stop becomes operative when the blade, following an impact, a breakage of the hub or of the primary holding means, or a similar event, is subject to a displacement force in the radial direction towards the outside.

The entire blade, or a portion of it, is then retained by the retaining device according to the invention, in particular by the stop formed by the moving retaining means.

It should be noted that the retaining device is activated automatically, or passively, by the simple rotation of the propeller creating the said centrifugal force.

Activation may be obtained when the propeller's speed of rotation, or blade's speed of rotation around the propeller's axis of rotation, reaches a predetermined value. This predetermined value may be equal to the propeller's speed of rotation at the aircraft's cruising RPM, or to a low-RPM low speed, for example when the aircraft is moving on the ground.

Thus, it is not necessary to install specific means dedicated to activating the retaining device.

In addition, when the retaining device according to the invention is inactive the moving retaining means do not form a stop for the blade in the radial direction towards the outside. Thus, the retaining device may be engaged in the recess or disengaged without difficulty, for example during maintenance operations.

Finally, the moving retaining means of the retaining device according to the invention are located in the recess. The retaining device does not therefore include elements opening in the area of the shell of the vane, which necessarily lead to a local modification of the vane's aerodynamic profile. The retaining device according to the invention does not lead to any modification of the external profile of the blade, meaning that its aerodynamic properties are unchanged.

According to the preferred embodiment, the said recess is demarcated by an inner surface having at least one stop surface. The said moving retaining means include at least one stop portion, where the said stop portion is at least partially opposite the said stop surface when the moving retaining means are in the deployed position.

Preferably, the said inner surface includes at least two stop surfaces, and the said moving retaining means include at least two moving components connected to one another, each having a stop portion.

The retaining device may include a retaining rod on which the said moving retaining means are assembled, such that they can move, where the said retaining rod is stationary in terms of translational motion in the said radial direction relative to the said hub.

The said retaining device may include a retaining rod on which the said moving components are assembled by a pin, such that the said moving components are simultaneously contra-rotating around the said pin when the movement from the said retracted position to the said deployed position occurs.

A protective sheath is advantageously positioned in the said recess, the inner surface of which contributes to demarcating the said recess, and includes the said stop surface or surfaces. The said sheath may define a retaining area of the said recess. The moving retaining means can be positioned in the said retaining area to co-operate with the stop surfaces.

Advantageously, the retaining device includes elastic return means for returning the said moving retaining means to the said retracted position. Thus, when the propeller's speed of rotation is zero or insufficient to activate the retaining device, the elastic return means hold the moving retaining means in the retracted position. In the same way, when the propeller's speed of rotation is insufficient to keep the retaining device according to the invention activated, the elastic return means cause the said moving retaining means to move from the deployed position to the retracted position.

Advantageously, the retaining device has, in the area of the said moving means in the retracted position, a maximum dimension in the transverse direction which is slightly less than the minimum dimension of the said recess in the said transverse direction. Thus, there is no difficulty in engaging the retaining device in, or disengaging it from, the blade's recess. Operations to manufacture the propeller or to maintain it can be undertaken without complications caused by the retaining device.

The propeller includes a propeller hub support positioned towards the inside relative to the said propeller hub. The said retaining device may be assembled at a lower end on the said propeller hub, or on the said propeller hub support, so as to prevent any roughly radial movement towards the outside of the said retaining device.

If the retaining device is assembled on the lower casing forming the hub support, the retaining device also enables the propeller hub to be retained, at the same time as the blade is retained.

The invention also relates to an aircraft turbomachine including at least one propeller according to any of the previous characteristics.

Finally, the invention relates to an aircraft including at least one turbomachine according to the previous characteristic.

Other advantages and characteristics of the invention will appear in the non-restrictive detailed disclosure below.

BRIEF DESCRIPTION OF THE ILLUSTRATIONS

Embodiments of the invention will now be described, as non-restrictive examples, with reference to the appended illustrations, in which:

FIG. 1, previously described, is a schematic view as a lengthways section along the axis of rotation of the propeller of a portion of propeller including a blade according to example embodiment of the prior art;

DETAILED DESCRIPTION OF A PREFERRED EMBODIMENT

Figure 2:
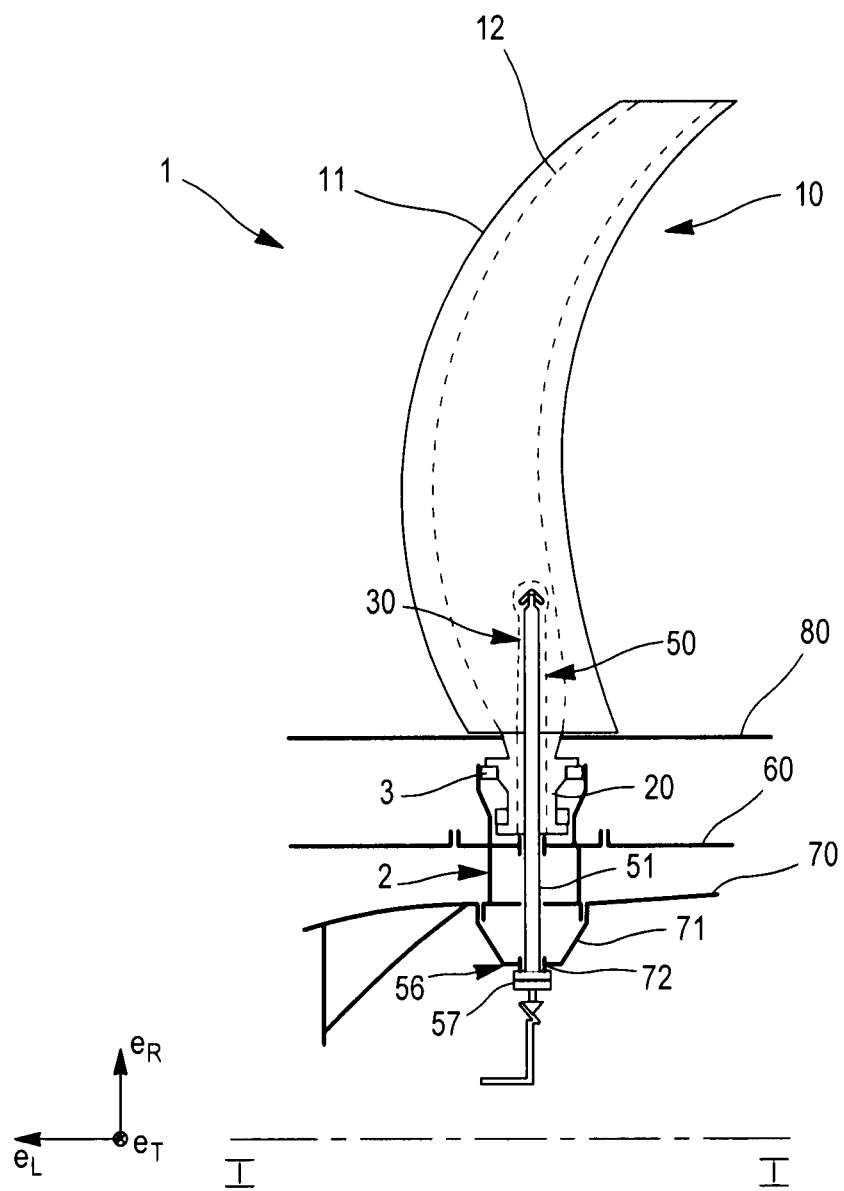
FIG. 2 is a schematic view as a lengthways section along the axis of rotation of the propeller of a portion of propeller including a blade fitted with a retaining device according to the preferred embodiment of the invention.

FIG. 2 illustrates a portion of an aircraft turbomachine propeller according to the preferred embodiment of the invention.

Figure 1:
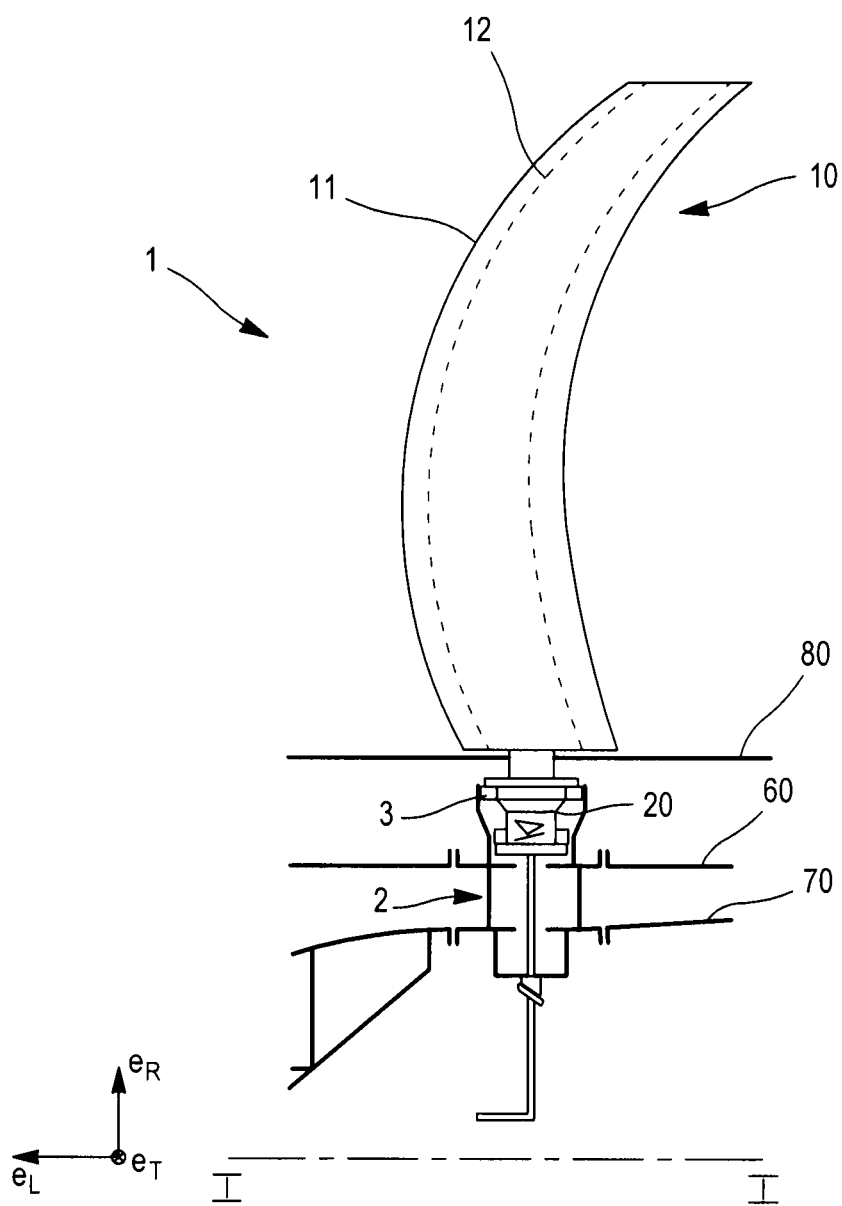

This portion of propeller includes elements identical or similar to those of the portion of propeller illustrated in FIG. 1 relative to the prior art, designated by numerical references which are identical to those of FIG. 1.

The portion of propeller according to FIG. 2 has a blade 1 including a recess 30 opening in the area of base 20 of blade 1, and which extends inside blade 1 over a portion of the latter, towards the outside in a direction roughly parallel to $e_R$.

According to the preferred embodiment of the invention, recess 30 traverses base 20 in radial direction $e_R$ and extends into a portion of vane 10 extending the said base 20. More specifically, recess 30 extends inside hollow structural core 12, over a portion of it. Within the said base, recess 30 is positioned in the axis of revolution of the general shape of base 20.

Recess 30 is demarcated by an inner surface of the blade. The inner surface demarcating recess 30 includes an inner surface of blade base 20 and an inner surface of vane 10.

Figure 3:
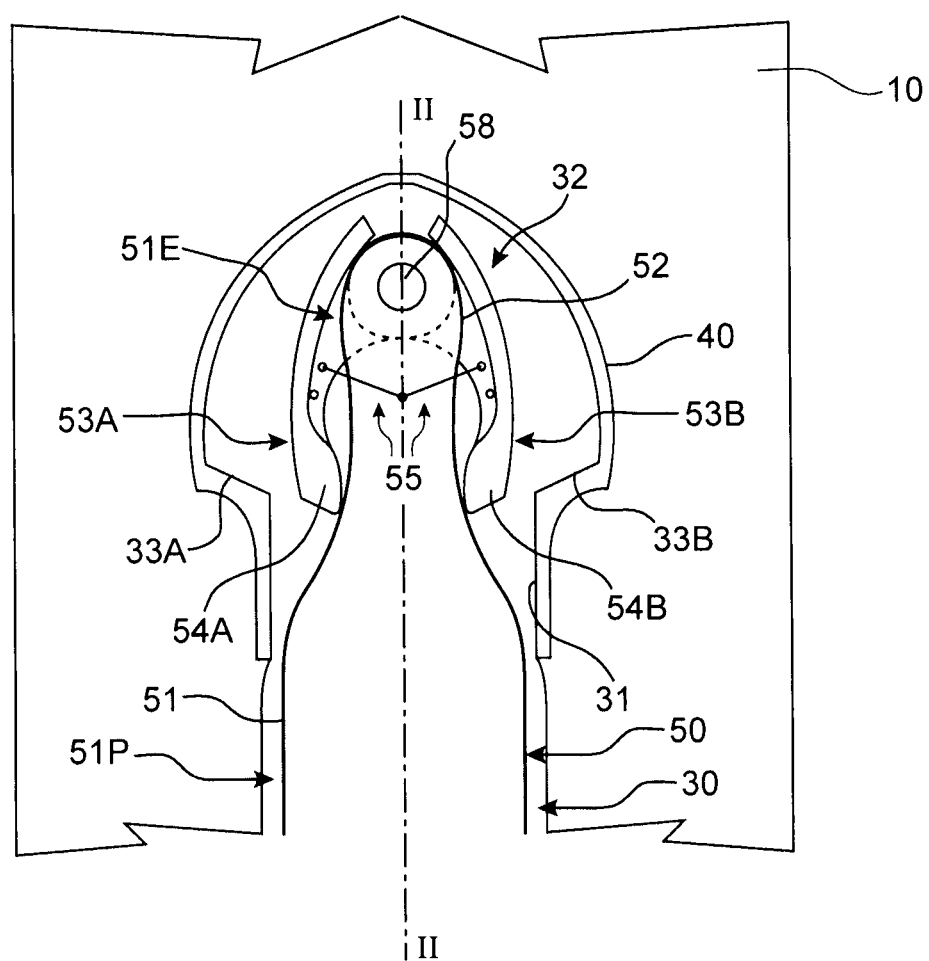
FIG. 3 is an enlarged, detailed view as a lengthways section along the axis of rotation of the propeller of a portion of the retaining device illustrated in FIG. 2, in which the moving retaining means are in the retracted position.

As is shown in greater detail in FIG. 3, recess 30 has, at its upper end, an enlarged retaining area 32.

A protective sheath 40 is positioned within the said enlarged retaining area 32. The meaning of "sheath" is a duct the outer surface of which is placed in contact with the inner surface of the blade; in this case of the inner surface of the vane.

The inner area of sheath 40 contributes to demarcating the recess. More specifically, the inner surface of sheath 40 demarcates enlarged retaining area 32.

Thus, recess 30 is demarcated by an inner surface 31 including the inner surface of sheath 40 in enlarged retaining area 32, and the inner surfaces of vane 10 and of the blade base.

The inner surface of sheath 40 includes two stop surfaces 33A and 33B. These stop surfaces 33A, 33B extend roughly transversely relative to the radial direction.

With reference to FIG. 3, blade 1 is fitted with a blade-retaining device 50, engaged inside the said recess 30.

Retaining device 50 includes, according to this embodiment, a retaining rod 51 which extends in a roughly radial direction.

Retaining rod 51 is assembled at a lower end on the lower casing which provides support for the hub, such that it cannot be moved radially towards the outside.

Retaining rod 51 includes an upper end 52 placed in the said recess 30, and a lower end positioned outside the said recess 30.

Retaining device 50 includes moving retaining means assembled such that they are rotating on retaining rod in the area of its upper end 52. The moving retaining means are positioned in the said recess 30, and more specifically in the enlarged retaining area 32.

The said moving retaining means include two moving components 53A and 53B connected to one another, each having a stop portion 54A, 54B. More specifically, connected moving components 53A, 53B are assembled such that they are rotating around a common axis 58 on retaining rod 51.

Retaining device 50 is fitted with elastic return means 55 connected either side of retaining shaft 51, and also to each of the said moving retaining components 53A, 53B.

These elastic means 55 return the moving components 53A, 53B to a retracted position.

In this retracted position each stop portion 54A, 54B is positioned close to, or in contact with, retaining rod 51.

Connected moving components 53A, 53B are positioned such that they are facing one another, in a roughly symmetrical manner, in a roughly radial plane of symmetry II-II passing through the said axis 58.

It should be noted that each moving component 53A, 53B has a centre of gravity which is not included in plane of symmetry II-II.

When connected moving components 53A, 53B are in the retracted position, stop portions 54A, 54B are not facing stop surfaces 33A, 33B of protective sheath 40. Thus, moving components 53A, 53B do not form a stop for the blade in the radial direction towards the outside.

It should be noted that retaining device 50 has, in the area of the said moving components 53A, 53B in the retracted position, a maximum dimension in the transverse direction which is slightly less than the minimum dimension of the said recess 30 in the said transverse direction.

More specifically, retaining rod 51 has a main component 51P which has a roughly constant average diameter and an upper end part 51E the diameter of which is slightly less than the said average diameter.

Thus, in the area of upper end part 51E of retaining rod 51, retaining device 50 has a maximum diameter, when moving components 53A, 53B are in the retracted position, which is roughly equal to the average diameter of main component 51P of retaining rod 51.

The said maximum diameter of retaining device 50 is slightly less than the minimum diameter of recess 30. Thus, retaining device 50 can be engaged in recess 30, or disengaged, without causing any operating difficulty.

Figure 4:
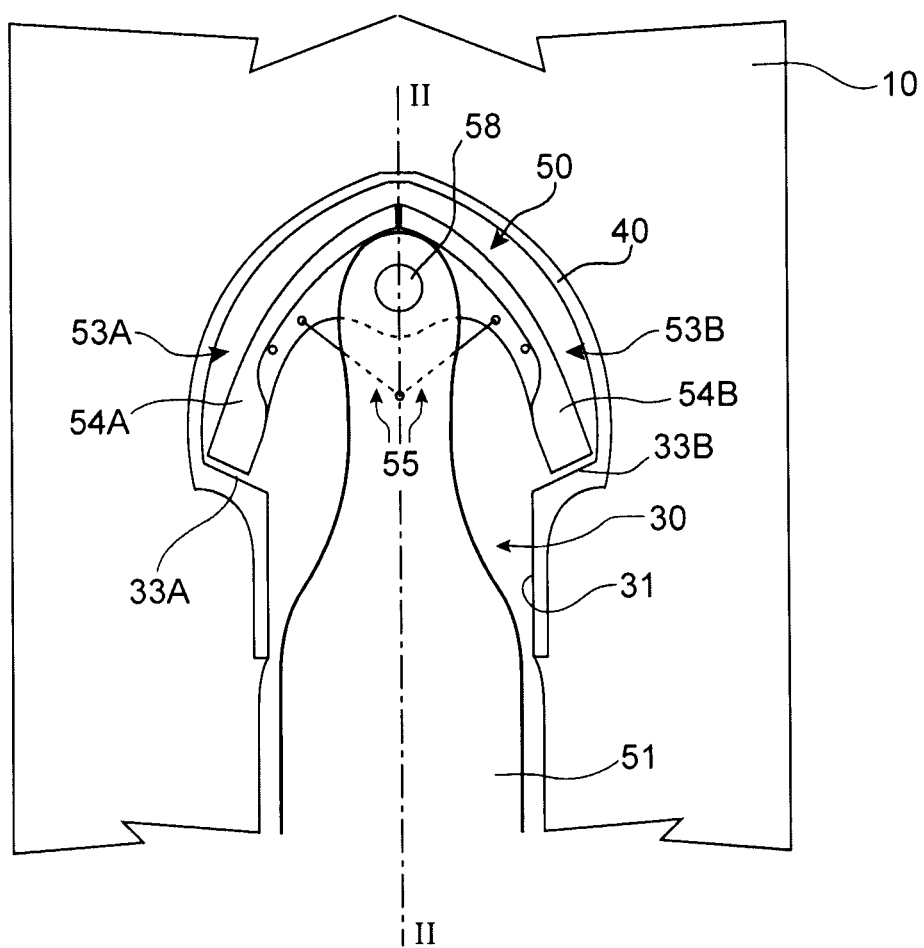
FIG. 4 is an enlarged, detailed view as a lengthways section along the axis of rotation of the propeller of a portion of the retaining device illustrated in FIG. 2, in which the moving retaining means are in the deployed position.

As is shown in FIG. 4, moving components 53A, 53B can occupy a deployed position.

In this case, stop portions 54A, 54B are located at least partially opposite stop surfaces 33A, 33B of protective sheath 40.

Moving components 53A, 53B then form a stop for the said blade in the said radial direction towards the outside. Retaining device 50 is said to be active.

There is a clearance between stop portions 54A, 54B and stop surfaces 33A, 33B. Alternatively, there may be no clearance.

Stop portions 54A, 54B are distant from retaining rod 51 compared to the retracted position. The distance of the centre of gravity of each moving component 53A, 53B is then greater than that defined when moving components 53A, 53B are in their retracted positions.

In their deployed position moving components 53A, 53B have a transverse separation relative to radial direction $e_R$, and relative to retaining rod 51, which is greater than in their retracted position configuration.

The meaning of "transverse separation" is a relative average movement away from one another of the moving components in a direction which is transverse relative to radial direction $e_R$. "Average movement away" must be understood in terms of the distance between the centres of gravity of the two moving components 53A, 53B.

Thus, when they occupy the deployed position moving components 53A, 53B can have a larger visible surface than that which they have in their retracted position.

The visible surface may be defined according to the radial direction relative to the hub.

Connected moving components 53A, 53B are able to be moved from the said retracted position to the said deployed position by the centrifugal force resulting from the rotation of the blade around the said axis of rotation of the propeller.

The operation of retaining device 50 is as follows, depending on the speed of rotation of the blade around the said axis of rotation of the propeller.

When the blade is at rest, or when it is rotating at an insufficient speed, moving components 53A, 53B are held in a retracted position by elastic return means 55.

The insufficient speed is defined relative to a reference speed for which moving components 53A, 53B are in the deployed position.

The reference speed may be a non-zero speed of rotation, in particular a low-RPM low speed when the aircraft is moving on the ground, or a cruising RPM high speed.

Stop portions 54A, 54B are not facing stop surfaces 33A, 33B of the sheath. They are close to, or in contact with, retaining rod 51.

Retaining device 50 does not retain the blade in the radial direction towards the outside. Retaining device 50 is then said to be inactive.

When the blade's speed of rotation is greater than or equal to the reference speed, connected moving components 53A, 53B are moved automatically from the retracted position to the deployed position.

Movement from the retracted position to the deployed position is obtained by the centrifugal force generated by the rotation of the blade around the propeller's axis of rotation I-I.

The intensity of the centrifugal force is then sufficient to cause connected moving components 53A, 53B to move.

When the move from the said retracted position to the said deployed position occurs moving components 53A, 53B are simultaneously contra-rotating around the said axis 58.

Stop portions 54A, 54B are at least partially facing stop surfaces 33A, 33B.

Moving components 53A, 53B then form a stop for the blade in the roughly radial direction towards the outside.

Retaining device 50 is then said to be active. The stop remains passive, or inoperative, for as long as the blade is not subject to a radial displacement force towards the outside following an impact, a breakage or similar event.

In the case of an impact of a foreign body against the blade, of a breakage of the blade, of hub 2 or of the primary holding means, or a similar event, the blade is subject to a displacement force in the radial direction towards the outside.

Retaining device 50 retains the blade. Each stop surface 33A, 33B comes into contact with facing stop portion 54A, 54B, and exerts an effort on it. Stop portion 54A, 54B exerts in return a reaction against corresponding stop surface 33A, 33B and by this means blocks the blade in the radial direction towards the outside. The stop is then said to be operative, or effective.

Finally, when the propeller's speed of rotation once again becomes less than the reference speed, elastic return means 55 cause connected moving components 53A, 53B to return to their retracted position.

The blade can then be disassembled from the hub without retaining device 50 blocking the operation. It can then be reassembled easily on the propeller hub.

Figure 5:
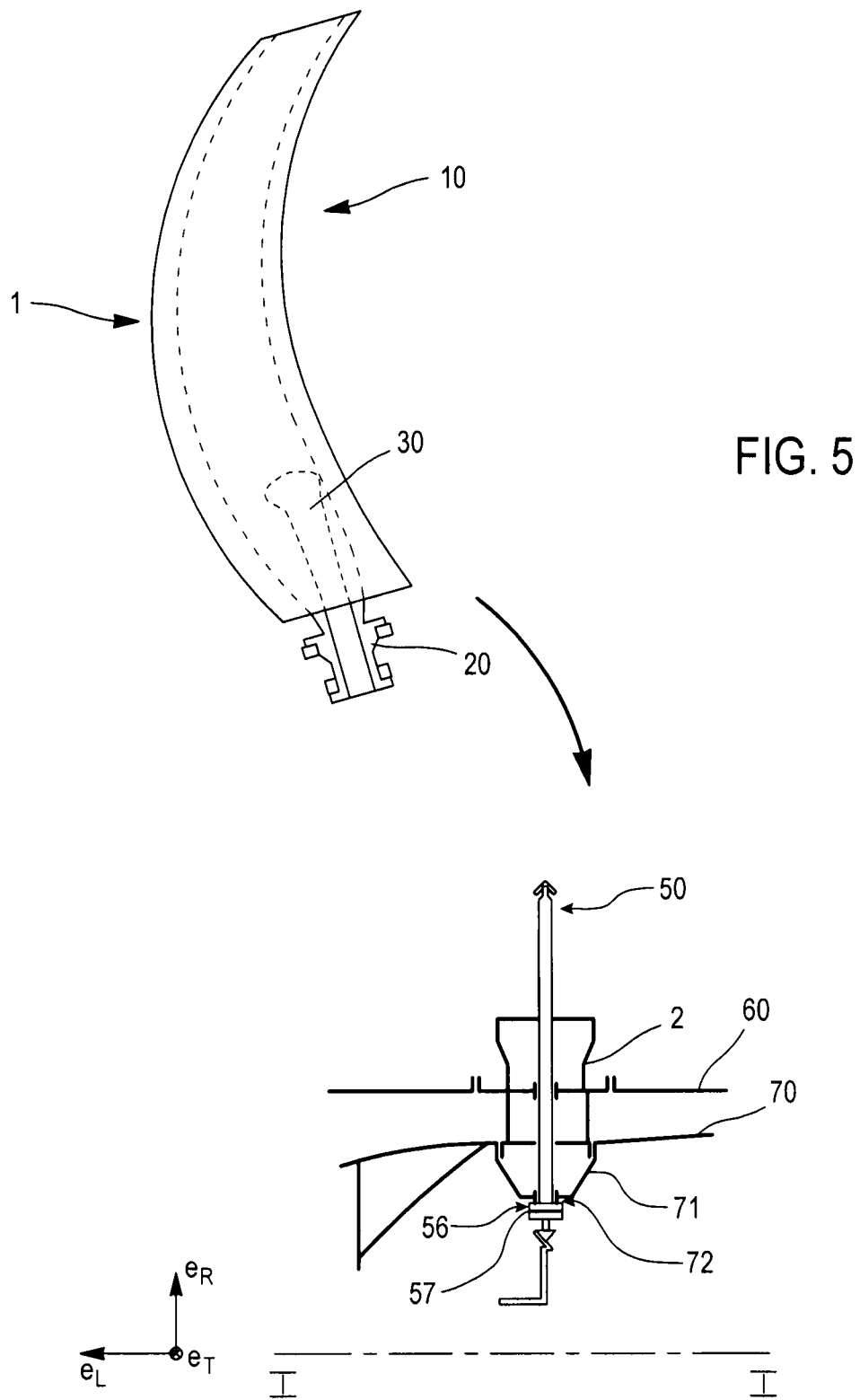
FIG. 5 is a schematic view as a lengthways section of a step of assembly of the portion of propeller represented in FIG. 2.

FIG. 5 illustrates a step of assembly of the said blade 1 on hub 2 and the retaining device.

The method of assembly of blade 1 is particularly easy. In a first step retaining device 50 is assembled on lower casing 70, such that it radially traverses propeller hub 2 towards the outside.

After this, blade 1 is brought close to hub 2 so as to introduce the retaining device in recess 30 of blade 1.

Lastly, base 20 of the blade is assembled on hub 2 through the primary holding means, including ball bearing system 3 (FIG. 2).

Retaining device 50 according to the invention also has a number of advantages.

Thus, the retaining device enables the portion of blade 1 receiving it to be stiffened.

Retaining device 50 can be extended inside blade 1 over a distance of between 0.2 and 0.6 times the total length of the latter along radial direction $e_R$. This distance preferably equals approximately 0.4 times the said total length of blade 1.

In the event of the impact of a foreign body the portion of blade 1 which could become uncoupled is that portion not receiving retaining device 50. The mass of the uncoupled portion is then therefore known. The length of retaining device 50 inside blade 1 is defined so as to obtain a mass of uncoupled blade portion presenting no danger for the surrounding parts of the aircraft.

Concerning the protective sheath, it is advantageous for it to be manufactured from a suitable material enabling the mechanical stresses generated when the stop described above is operative to be distributed uniformly.

The stresses are thus transmitted in a roughly uniform manner to the inner surface of the vane, in the enlarged retaining area. This enables the said inner surface of the vane to be prevented from becoming embrittled locally, notably as a consequence of a possible concentration of stresses in the stop surfaces.

Another advantage concerns the assembly of the retaining device on the lower casing.

With reference to FIGS. 2 and 5, lower end 56 of the said retaining device 50 is assembled on lower casing 70, so as to prevent any radial movement away, towards the outside, of the said retaining device.

In the particular case of this embodiment, lower casing 70 is secured relative to hub 2. Alternatively, it may be rotating around the propeller's axis of rotation I-I, and rotate at an angular speed equal to or different from that of hub 2.

The said lower end 56 of the retaining device traverses lower casing 70 in the area of a U-shaped component 71, oriented towards the inside, which holds this casing.

Holding component 71 has an aperture 72 which extends circumferentially around the said axis of rotation of the propeller I-I.

Lower end 56 of the retaining device includes a stop portion 57, of a roughly annular shape, protruding from the adjacent surface of the said lower end 56.

The edge of the said aperture 72 has a surface forming a stop located radially towards the outside relative to the said stop portion 57 of the retaining device.

Thus, on impact of a bird or any other foreign body, on breakage of the hub or of the primary holding means, or following a similar event, the retaining device is subject to a roughly radial translation force towards the outside. Stop portion 57 of the retaining device is then in contact against the stop surface of lower casing 70, and thus prevents any radial movement away of the retaining device, and thus of blade 1, towards the outside.

As an unrepresented variant of the preferred embodiment of the invention, lower casing 70 can be rotating around the propeller's axis of rotation I-I and rotate at an angular speed equal to that of hub 2.

In this case the aperture in the holding component of lower casing 70 does not extend circumferentially around the propeller's axis I-I, but has a circular shape coaxial with that of the retaining device.

According to another unrepresented variant of the preferred embodiment of the invention, the retaining device is prevented from any translational motion towards the outside on the propeller hub, instead of on the lower casing.

The hub then includes an aperture traversed by the retaining device, the edge of which includes a surface forming a stop. This surface forming a stop is positioned nearby, or in contact with, the stop portion of the retaining means, in the radial direction towards the outside.

According to another variant, the recess inside the blade can be extended only inside the base, and is not extended inside the vane. The upper end of the retaining device is then assembled securely on the said base, inside it. A mounting pin traversing transversely the base and the retaining means, similar to that which was described above, allows any radial translational motion towards the outside of the blade relative to the retaining means to be prevented.

Lastly, according to other embodiments of the invention, the moving retaining means are moved from the retracted position to the deployed position by motive means and not by the said centrifugal force.

Thus, according to a second embodiment of the invention, the means for moving the moving retaining means are essentially mechanical. The motive means can include an endless screw positioned inside the retaining rod, and more specifically in a recess of the retaining rod which extends along the lengthways direction of this rod. The connected moving components are assembled on the endless screw, by a gearing system, such that rotation in one direction of the said screw causes the said moving components to move from the retracted position to the deployed position. Conversely, rotation of the said screw in an opposite direction causes the moving components to move from the deployed position to the retracted position. The endless screw can be operated by an operator when the propeller is at rest. It can also be operated by an electric mechanism, with the propeller at rest or rotating.

According to a variant of the second embodiment, the motive means can include a fluid mechanical actuator, for example of the pneumatic type. The moving components are then assembled on a pneumatic jack, more specifically on the rod of the jack piston. The piston rod can be located inside a recess of the retaining rod which extends along the lengthways direction of the rod, and be connected to the moving retaining components through a gearing mechanism. The recess of the retaining rod can then form the jack cylinder. The piston rod can alternatively be positioned in a direction which is roughly transversal to the retaining rod, and be located near the moving retaining components. Operation of the jack causes the moving retaining components to move from the retracted position to the deployed position, and vice versa. It is possible that the elastic return means for returning the moving retaining components to the retracted position may no longer be required.

Alternatively, the motive means can be operated electromagnetically. Thus, according to a third embodiment of the invention, the moving retaining components are assembled on an electromagnetic actuator, for example a linear one, such as an electromagnet, which may possibly be positioned inside the retaining rod, in its upper end. More specifically, the moving components are assembled on the moving armature of the electromagnet. Advantageously, the moving retaining components are, at rest, i.e. when the electromagnet is not powered, in the deployed position, for example due to the application of pressure by elastic means. The elastic means can be connected directly to the moving retaining components, or indirectly through the moving armature. The retaining device is then activated. When the electromagnet is powered the generated magnetic field causes the moving armature to move, and thus causes the moving retaining components to move from the deployed position to the retracted position.

According to a variant of the third embodiment, the moving retaining components can be, when at rest, in the retracted position. Application of the motive means causes the moving components to move from their retracted position to the deployed position.

In their deployed position configuration the moving retaining means have a greater transverse separation, relative to the radial direction, than in their retracted position configuration.

Other electromagnetic actuators can be used, such as for example single-winding rotary actuators, whether or not associated with a gearing mechanism, a torque motor, or an electrodynamic actuator.

According to another variant, the moving retaining components can be, when at rest, in the retracted position, under the magnetic force of a passive magnet. When the centrifugal force becomes greater than a certain threshold, it is then greater than the magnetic force, and causes the moving retaining components to move from the retracted position to the deployed position. Conversely, when the centrifugal force becomes less than the said threshold the magnetic force becomes greater, and causes the moving retaining components to move from the deployed position to the retracted position.

Naturally, various modifications can be made by the man skilled in the art to the invention which has just been described, solely as non-restrictive examples.

In addition, the invention also applies to turboprop engines and turbine engines, preferably of the "open rotor" type.

The invention claimed is:

1. An aircraft turbomachine propeller, comprising:
multiple blades, each including a base assembled on a hub rotating around an axis of rotation of the propeller,
wherein at least one blade includes a recess opening radially towards the inside in an area of a base of this blade, and
wherein the propeller includes, in association with the recess, a blade-retaining device that is stationary in terms of translational motion in a radial direction towards the outside relative to the hub, including moving retaining means positioned in the recess and configured to occupy:
a retracted position in which the moving retaining means does not form a stop for the blade in the radial direction towards the outside;
a deployed position in which the moving retaining means forms a stop for the blade in the radial direction towards the outside; and
to be moved from one to the other of the positions.

2. A propeller according to claim 1, wherein the moving retaining means is configured to be moved from the retracted position to the deployed position by centrifugal force resulting from rotation of the blade around the axis of rotation of the propeller.

3. A propeller according to claim 1, wherein the recess is demarcated by an inner surface including at least one stop surface, and the moving retaining means includes at least one stop portion, wherein the stop portion is at least partially opposite the stop surface when the moving retaining means is in the deployed position.

4. A propeller according to claim 3, wherein the inner surface includes at least two stop surfaces, and the moving retaining means includes at least two moving components connected to one another, each having a stop portion.

5. A propeller according to claim 4, wherein the retaining device includes a retaining rod on which the moving components are assembled by a pin, such that the moving components are simultaneously contra-rotating around the pin when moving from the retracted position to the deployed position.

6. A propeller according to claim 3, wherein a protective sheath is positioned in the recess, the inner surface of which contributes to demarcating the recess and includes the at least one stop surface.

7. A propeller according to claim 1, wherein the retaining device includes elastic return means for returning the moving retaining means to the retracted position.

8. A propeller according to claim 1, wherein the retaining device has, in the area of the moving means, when in the retracted position, a maximum dimension in the transverse direction that is less than the minimum dimension of the recess in the transverse direction.

9. A propeller according to claim 1, further comprising a propeller hub support positioned towards the inside relative to the propeller hub, wherein the retaining device is assembled at a lower end on the propeller hub or on the propeller hub support, so as to prevent any roughly radial movement towards the outside of the retaining device.

10. An aircraft turbomachine comprising at least one propeller according to claim 1.

* * * * *